April 28, 1925.

L. E. EDMUNDS 1,535,114

FLANGED SPROCKET WHEEL

Filed Nov. 8, 1924

INVENTOR.
Levi E Edmunds
By H. W. Williamson
Atty.

Patented Apr. 28, 1925.

1,535,114

UNITED STATES PATENT OFFICE.

LEVI E. EDMUNDS, OF PHILADELPHIA, PENNSYLVANIA.

FLANGED SPROCKET WHEEL.

Application filed November 8, 1924. Serial No. 748,643.

*To all whom it may concern:*

Be it known that I, LEVI E. EDMUNDS, a citizen of the United States, residing at Philadelphia, in the county of Philadelphia and State of Pennsylvania, have invented new and useful Improvements in a Flanged Sprocket Wheel, of which the following is a specification.

My invention relates to new and useful improvements in a flanged sprocket wheel, which is particularly adapted for use with the ship propulsion means shown and described in the application bearing Serial Number 652,946, under date of July 21st, 1923, in which I am a joint inventor and the present invention has for its primary object to so construct a sprocket wheel as to prevent or reduce the possibility of the paddle carrying chain from being accidentally displaced from the sprocket wheel.

Another object of my invention is to construct a sprocket wheel so fashioned as to provide side flanges the outer edges of which decrease to predetermined points on the sprocket wheel to provide transverse recesses at the points where certain links of a chain will strike in passing around the sprocket wheel.

A further object of the invention is to fashion the flanges as to provide a trough in which the teeth are located and in which the chain will fit when passing around the sprocket wheel.

A still further object of this invention is to provide for making the flanges an integral part of the sprocket wheel or to form them as separate elements either in a complete ring or in sections which may be riveted or otherwise secured to some desirable part of the sprocket wheel.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Figure 1:
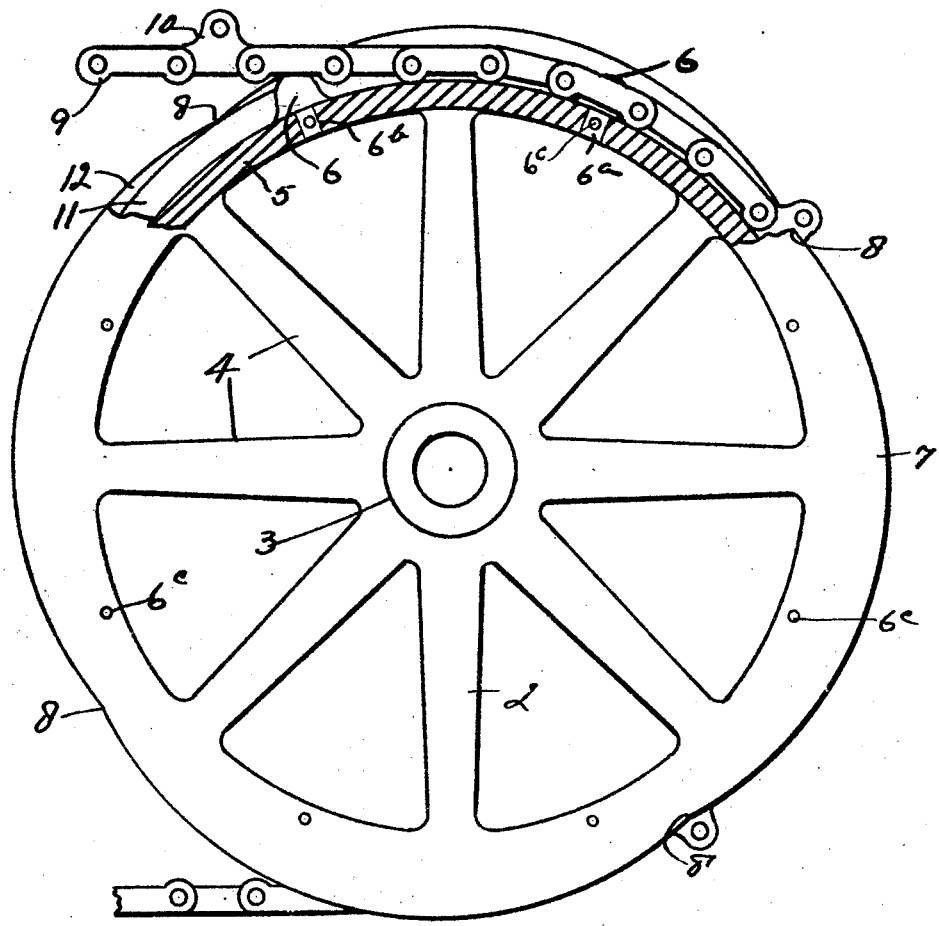
Fig. 1, is a side elevation of a sprocket wheel constructed in accordance with my invention and having a section of one of the flanges broken away to illustrate details of construction and further showing a section of chain with relation thereto.

In carrying out my invention as here embodied, 2 represents a sprocket wheel of any desirable or well known construction whether made up of one piece or a number of sections and includes the hub 3, spokes 4, a rim 5 and teeth 6, positioned in any desirable manner but preferably arranged in spaced relation midway between the spokes.

The teeth 6 are preferably made separate from the sprocket wheel so as to be removable and interchangeable, therefore said teeth are shown as having posts $6^a$ formed therewith for registration with the sockets $6^b$ formed in the rim of the sprocket wheel, said teeth being held against accidental displacement by suitable securing means $6^c$, such as pins, passing through the rim of the sprocket wheel and the posts of the several teeth.

Projecting from both sides of the rim are flanges 7 which are so fashioned that their outer edges form long scallops, or in other words, said flanges decrease in height from a number of points on the wheel in opposite directions to other points midway between adjacent high points, thereby forming transverse recesses 8.

The reference numeral 9 represents a chain including the usual open and closed links and in this particular chain certain of the closed links are provided with lugs 10 projecting beyond the outer surface of said chain for the reception of the ends of the paddle axles as described in the application mentioned above and since this axle extends from one chain to another the axle bearing portions of the lugs 10 must project beyond the flanges 7 when passing around the sprocket wheel for which reason said flanges are decreased in width until they form the recesses 8 at which points the lug carrying links will always strike when passing around the sprocket wheel.

Figure 2:
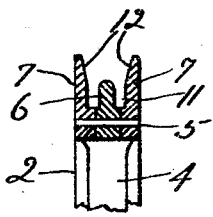
Fig. 2, is a cross section through the rim thereof.

As plainly shown in Fig. 2, the inner faces of the flanges run parallel or straight for a height equal to the thickness of the chain or substantially the same height as the sprocket wheel teeth thereby providing a trough 11, while beyond or outside of the straight faces the inner faces of said flanges are beveled as at 12 so as to diverge in order that the chain will be readily guided into the trough.

Figure 3:
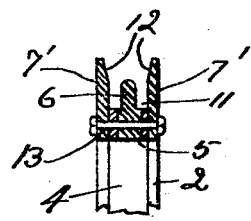
Fig. 3, is a view similar to Fig. 2 showing the flanges made separate from the sprocket wheel and secured thereto.

So far it has been the intention that the flanges be considered as an integral part of the sprocket wheel but the same idea may be carried out by making said flanges separate from the wheel, as shown in Fig. 3, wherein said flanges are designated by the numeral 7'. Where the flanges are made separate they are fixed on each side of the sprocket wheel by suitable fastening means 13 such as bolts, rivets or other equivalent means and, as before stated, these flanges may be one complete ring or they may be made up of a number of sections as the same principle is carried out in either case. Where the flanges are separate elements and therefore removable the same fastening means 13 which holds said flanges on the sprocket wheel may be used as the attaching means for the teeth as will be obvious by reference to Fig. 3.

Of course I do not wish to be limited to the exact details of construction as herein shown as these may be varied within the limits of the appended claims without departing from the spirit of my invention.

Having thus fully described my invention, what I claim as new and useful is:—

1. A sprocket wheel including a hub, spokes radiating therefrom, a rim at the outer ends of the spokes, teeth projecting from said rim, and flanges carried by said rim, said flanges decreasing in width from a number of points about the wheel to other points intermediate the first named points whereby transverse recesses are formed, the inner faces of said flanges being straight for a distance approximately equal to the height of the teeth to produce a trough and then beveled outward to form a diverging portion as a guide for a chain.

2. A sprocket wheel including a hub, spokes radiating therefrom, a rim at the outer ends of the spokes, teeth projecting from said rim, and flanges carried by said rim, said flanges decreasing in width from a number of points about the wheel to other points intermediate the first named points whereby transverse recesses are formed, the inner faces of said flanges being straight for a distance approximately equal to the height of the teeth to produce a trough and then beveled outward, in combination with a chain having open and closed links and lugs on certain of said closed links, the chain being so positioned relative to the sprocket wheel that the lug carrying links will always engage the sprocket wheel in the region of the transverse recesses.

3. A sprocket wheel including a hub, spokes radiating therefrom, a rim at the outer ends of the spokes, teeth removably and interchangeably socketed in said rim, means to prevent accidental displacement of said teeth, and flanges carried by said rim, said flanges decreasing in width from a number of points about the wheel to other points intermediate the first named points whereby transverse recesses are formed, the inner faces of said flanges being straight for a distance approximately equal to the height of the teeth to produce a trough and then beveled outward to form a diverging portion as a guide for a chain.

4. A sprocket wheel including a hub, spokes radiating therefrom, a rim at the outer ends of the spokes, said rim having sockets therein, teeth provided with posts for registration with said sockets, flanges on the sides of the rim, said flanges decreasing in width from a number of points about the wheel to other points intermediate the first named points whereby transverse recesses are formed, the inner faces of said flanges being straight for a distance approximating the height of the teeth to produce a trough and then beveled outward to form diverging portions, and means passing through said flanges, the sprocket wheel rim and the posts of the teeth to hold said parts together.

In testimony whereof, I have hereunto affixed my signature.

LEVI E. EDMUNDS.